(12) United States Patent
Lofton et al.

(10) Patent No.: US 7,702,575 B1
(45) Date of Patent: Apr. 20, 2010

(54) CONSUMER RISK OPERATIONS SERVICING SYSTEM (CROSS) INCLUDING REAL ESTATE IMPLEMENTATION

(75) Inventors: Scott Lofton, Jacksonville, FL (US); Michael R. Bartholomew, Charlotte, NC (US); David R. King, Jacksonville, FL (US); David Breitenstein, Jacksonville, FL (US); Scott Ausum, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 1531 days.

(21) Appl. No.: 10/779,167

(22) Filed: Feb. 13, 2004

(51) Int. Cl.
*G06Q 40/00* (2006.01)
(52) U.S. Cl. ...................................................... 705/38
(58) Field of Classification Search ............. 705/30–35, 705/38–40; 379/266; 710/39, 54, 263; 370/412–417, 370/429, 440; 340/7.3
See application file for complete search history.

(56) References Cited

U.S. PATENT DOCUMENTS 4,774,664 A * 9/1988 Campbell et al. ............. 705/38
5,594,791 A * 1/1997 Szlam et al. ............. 379/265.09
7,191,150 B1 * 3/2007 Shao et al. ..................... 705/38

OTHER PUBLICATIONS

PR Newswire article "Alltel Provides Access to Early Indicators Loss Mitigation Tool", New York, Mar. 3, 1998, p. 1.*

* cited by examiner

*Primary Examiner*—Mary Cheung
(74) *Attorney, Agent, or Firm*—Banner & Witcoff, Ltd.

(57) ABSTRACT

In an embodiment, integrated access to the collections and recovery process, including, for example, real estate loan-related aspects, is provided through a single GUI (graphical user interface) on a single workstation. Data and functions from incompatible legacy systems supported by different parties are integrated, such that collections and recovery representatives can access the systems, including mortgage servicing systems, through a single browser-based GUI that may be provided on a desktop access device. Additions and deletions of prior systems and functions may be facilitated through API's, pre-processors, and other functionality. An automated decision engine also may be utilized. Disclosed embodiments may be useful for the financial industry, including banking institutions and other lenders, as well as for entities that interact with the financial industry.

67 Claims, 9 Drawing Sheets

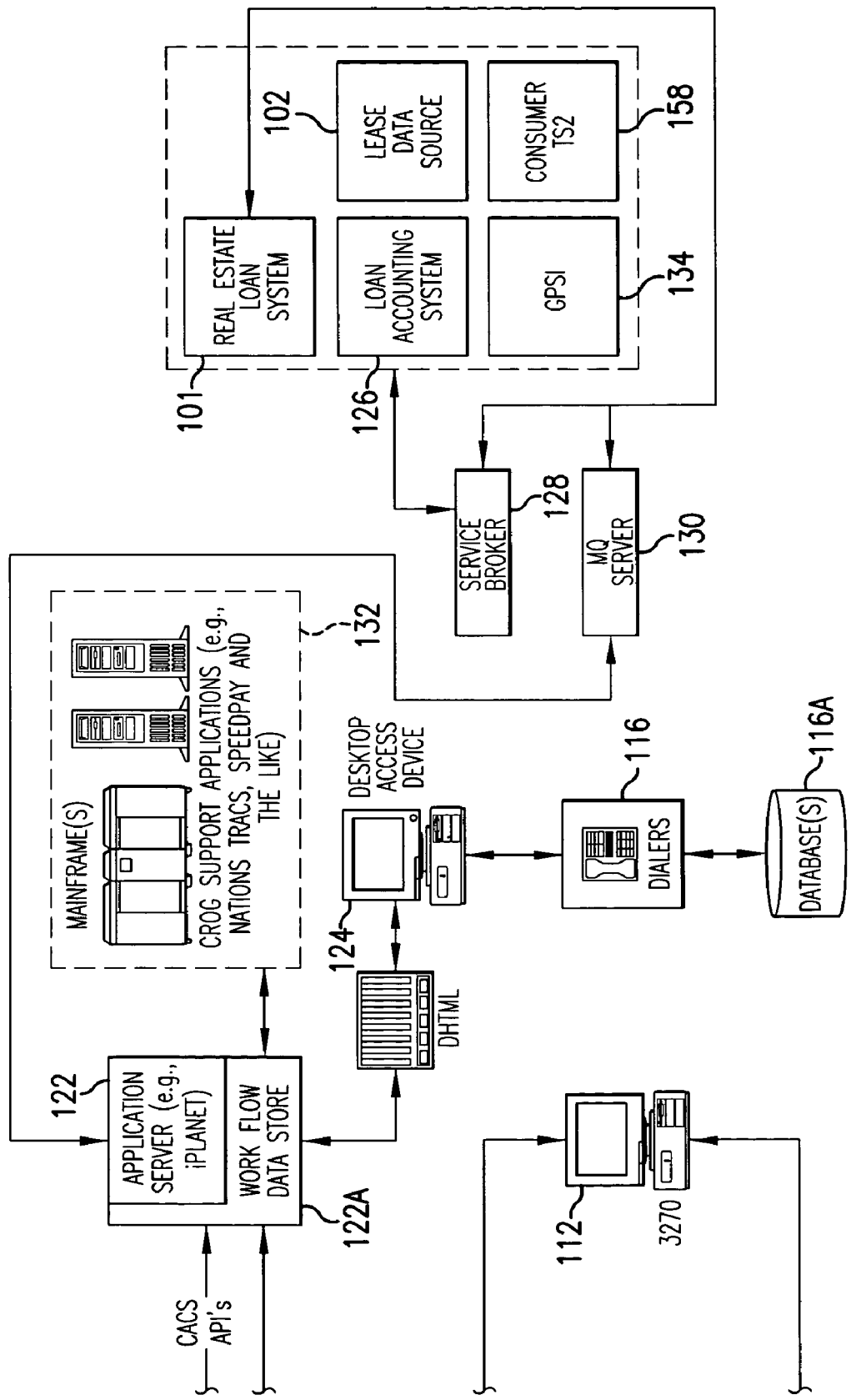

FIG. 4

Payment Arrangements

Person [PRIM ▼]  Place [BUS1 ▼]  Activity Code [Outbound Call ▼]

1234567890987 (r-estate)  [List] [Edit] [New]   Clear SP: 987654321

Excuse Code [PTP-MAIL ▼]   Max Pdt 12/06/2003   Ttl Due 306.79

Transactions [3]

Day of Month [ ]

| | Check Amt | Check Date | Check No | Check Memo | Charge Fees |
|---|---|---|---|---|---|
| Payment 1 | $106.79 | 11/19/2003 | 111 | | ☑ $10.00 |
| Payment 2 | $100 | 12/19/2003/mo ▼ | 112 | | ☑ $10.00 |
| Payment 3 | $100 | 01/19/2004 | 113 | | ☑ $10.00 |

History Text [ ]

[Save] [Cancel]

FIG.5

Repo-Referral to Repossession

Special Instructions

Account Referred to Repossession Department by:
Name: Johnny Johnson
Phone: 9045551212
Fax: 9045551234

[Save] [Cancel]

FIG. 6

CONSUMER RISK OPERATIONS SERVICING SYSTEM (CROSS) INCLUDING REAL ESTATE IMPLEMENTATION

RELATED APPLICATIONS

This application claims priority to U.S. application Ser. No. 10/340,205, filed on Jan. 10, 2003, which claims priority to U.S. provisional patent application Ser. No. 60/395,790, filed on Jul. 12, 2002, the contents of both of which are incorporated herein by reference.

BACKGROUND

The financial industry is the lifeblood of a free market economy. Financial institutions, such as corporate banks, for example, enable the purchasing power of consumers by extending and/or servicing loans and lease arrangements, for example, entered into by the consumers. In particular, such institutions provide loans to enable consumers to purchase real estate. Under certain circumstances, however, various consumers may not meet their financial obligations under such loans. When a mortgage loan account of a consumer becomes delinquent, for example, it may become necessary for the financial institution to pursue one or more collection and recovery activities.

Collection and recovery efforts may implicate a host of scenarios in addition to delinquency situations. For instance, a consumer may wish to initiate an EFT (electronic funds transfer) payment of an obligation with the financial institution as a regular payment (i.e., a payment that is not made as a past due payment) under a real estate loan arrangement. Furthermore, when a consumer dies, action may need to be taken by the financial institution to preserve the rights of the institution under, for instance, a mortgage arrangement previously executed with the decedent prior to his death.

A variety of narrowly focused computer systems have been developed in the art by different parties to store and/or manage information associated with different, limited aspects of collection and recovery efforts. However, no existing systems cover a substantial portion of the collection and recovery process. Instead, in conventional practice, a collection and recovery agent typically must deal with a multitude of incompatible legacy computer systems. Often the agent must access each of these legacy systems through a variety of different computer systems. In addition, the agent usually must perform a number of burdensome manual tasks in association with collection and recovery efforts without the convenience of computerization and/or automation. It can be seen that the operation of existing systems can increase operational costs and may adversely impact the effectiveness and efficiency of customer service efforts of the financial institution.

Therefore, it can be appreciated that existing systems for performing collections and recovery operations generally are not user-friendly; are inefficient and time-consuming; are not truly paperless or near paperless systems; require redundant data entry; are difficult to administer and modify or enhance; and often are incompatible with other computer systems. Using these existing systems, a financial institution cannot readily achieve an adequate level of customer service in an efficient and cost-effective manner.

BRIEF DESCRIPTION OF THE DRAWINGS

FIG. 4 is an illustrative graphical user interface that can be employed in connection with one or more embodiments of the present invention.

FIG. 5 is an illustrative graphical user interface that can be employed in connection with one or more embodiments of the present invention.

FIG. 6 is an illustrative graphical user interface that can be employed in connection with one or more embodiments of the present invention.

DETAILED DESCRIPTION

Figure 1:
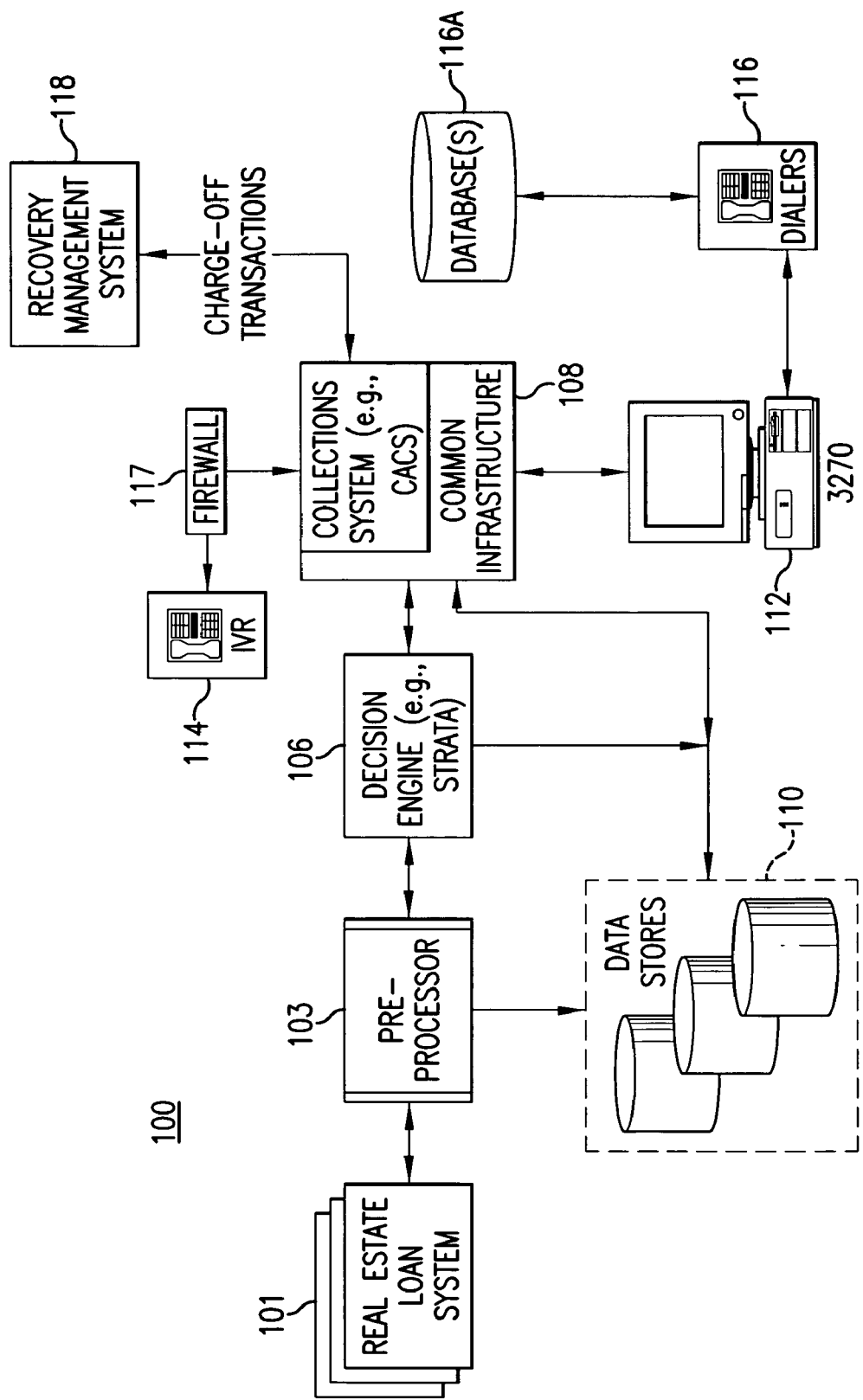
FIG. 1 is a schematic diagram of an illustrative system provided in accordance with various embodiments of the present invention.

The following description refers to the accompanying drawings that illustrate sample embodiments of the present inventions. Other embodiments are possible and modifications may be made to the embodiments without departing from the spirit and scope of the invention. Therefore, the following detailed description is not meant to limit the present invention. Rather, the scope of the present invention is defined by the appended claims.

In an embodiment of the present invention, integrated access to the collections and recovery process, including, for example, real estate loan-related aspects, is provided through a single GUI (graphical user interface) on a single workstation. Data and functions from incompatible legacy systems supported by different parties may be integrated, such that collections and recovery representatives can access the systems, including mortgage servicing systems, through a single browser-based GUI that may be provided on a desktop access device. Additions and deletions of prior systems and functions may be facilitated through API's, pre-processors, and other functionality. An automated decision engine also may be utilized.

Embodiments herein may be useful for the financial industry, including banking institutions and other lenders, as well as for entities that interact with the financial industry.

Embodiments herein enable entities to achieve increased collections with a reduced workforce.

Financial institutions can include, for example and without limitation, privately owned entities that collect and invest funds, government agencies that collect and invest funds, depository financial institutions (e.g., commercial banks, savings and loan associations, mutual savings banks, credit unions, and the like), non-depository financial institutions (e.g., brokerage firms, life insurance companies, pension funds, investment companies, and the like), or reasonable combinations thereof. An example of a financial institution is a corporate bank that provides its customers with savings accounts, checking accounts, loans including real estate loans (e.g., mortgages), access to investments, and other various financial products and services. Customers or consumers of such financial institutions may include, for example and without limitation, individuals, corporations, partnerships, limited liability companies, limited liability partnerships, trusts, or other types of commercial and non-commercial entities capable of using and/or benefiting from the goods and services provided by the financial institution.

Obligations can include any financial arrangement between two or more parties in which at least one liability is maintained by at least one of the parties as a consequence of the arrangement. Examples of obligations include, without limitation, loan arrangements (e.g., real estate loans).

Various embodiments discussed herein may involve a system of record or equivalents. A system of record may include any kind of data storage and/or management system for any kind of setting. Particular systems of record may include systems designated as master repositories for accounting information, for example, such as loan information suitable for use in the context of financial transactions or a financial institution.

Embodiments of the present invention provide for collections and recovery implementations. In one embodiment of the present invention, a platform is provided that may be implemented across an enterprise, such as a financial institution. In various illustrative embodiments described herein, the platform may be used to assist associates or agents, such as, for example, escalation agents, who handle loans or leases of customers or consumers of the financial institution. In various aspects, the accounts of such customers may possess a status positioned along the spectrum from delinquent to good standing. It can be seen that application of different aspects of the various embodiments described herein may be suitable in view of the financial status of customer accounts.

Referring now to FIG. 1, a system 100 is illustrated according to one illustrative embodiment of the present invention. The system 100 may be a particular implementation of a Consumer Risk Operations Servicing System (herein sometimes "CROSS"), for example, such as an embodiment of the present invention implemented by Bank of America Corporation (Charlotte, N.C.), known as the CROSS system or "NextGen" system. In one illustrative embodiment, the system 100 can be operated by one or more banks, for example, or other financial institutions.

The system 100 includes various applications or modules that may communicate over various reasonably appropriate means, such as wireline, wireless, or infrared connections. Modules may communicate over networks, such as intranets and the Internet, for example. In addition, encrypted communication may occur between or among various modules. In various embodiments of the present invention, various applications or modules in the system 100 are secured by one or more firewalls 117 or other firewalls (not shown). In the situation wherein certain applications or modules operate outside of firewalls, secured servers may be employed to safeguard or substantially safeguard interactions between/among the various applications or modules. In certain embodiments, secured socket layer (SSL) connections, for example, may be used with VPN's (virtual private networks), for example.

The system 100 depicts various systems offered by one or more entities that may be third parties (e.g., a credit bureau) with regard to a financial institution that employs the system 100. It can be appreciated, however, that alternative systems with similar functionality may be implemented in the system 100 within the scope of the present invention. In general, data systems employed in association with operation of the system 100 may include data, including transactional information, useful to the system 100. Systems having the designations "MSP" (Mortgage Servicing Package), "Indirect ALS" (Advanced Loan System), "ALS," "Direct ALS" (DALS), and "LeaseMaster" are examples of data systems that can be configured for use in the system 100. It will be appreciated that alternative or additional data systems may be incorporated into the system 100 in other embodiments of the present invention.

As shown in FIG. 1, a real estate loan system 101 is an example of a data system that can be employed in connection with the system 100. One example of the real estate loan system 101 is the trade-designated "MSP" (Mortgage Servicing Package, marketed by Fidelity Information Services, Inc.). In one embodiment, the real estate loan system 101 is a loan accounting system that can be executed on a mainframe computer. In another embodiment, the real estate loan system 101 stores and manages information associated with, for instance, fixed-rate and adjustable-rate mortgages, construction loans, equity lines of credit, and daily simple interest loans.

Another example of a data system is a loan accounting system 126 (see FIG. 2) having the ALS trade designation, which is a loan accounting system offered by Fidelity Information Services, Inc. The loan accounting system 126 can store and manage information associated with loans, such as indirect and/or direct secured loans, for example. Indirect loans may originate at third parties, such as automobile dealerships or electronic goods retailers, for example, and may be serviced by an operator of the system 100. Direct loans may originate at, and be serviced by, an operator of the system 100. In one embodiment, at least two loan accounting systems 126 are used in connection with the system 100, where a first such system is associated with indirect secured loans, and a second such system is associated with direct secured loans. The two systems may be associated with a single pre-processor 104. Alternatively, each of the two systems may have an associated pre-processor 104 (e.g., see FIG. 3A).

The loan accounting system may include a record for loans processed and/or serviced in association with the system 100. The loan accounting system 126 may be considered a system of record for loans associated with the system 100.

It is to be appreciated that, in certain embodiments, the real estate loan system 101 may be a particular implementation of the loan accounting system 126.

A lease data source 102 (see FIG. 3A) is an example of another data system that can be employed in connection with the system 100. One example of the lease data source 102 is the trade-designated "LeaseMaster" data system (marketed by Fiserv, Inc.). In one embodiment, the lease data source 102 can be executed on a mainframe computer. In another embodiment, the lease data source 102 stores and manages information associated with leases of cars and trucks.

In other aspects of the present invention, one or more additional data sources (not shown) can be provided within the system 100. Examples of the additional data sources include, without limitation, a "Bacardi" data system, a "GPSI" data system, an "RMCIF" data system, a "Customer AG" data system, and an "EDW" data system. The "Bacardi" and "RMCIF" data systems provide consumer credit scores related to consumer accounts held by a financial institution. The "GPSI" data system (described hereinbelow in more detail) includes an index of customer information including consumer credit ratings (e.g., whether such customers are considered "preferred" based on a credit evaluation system of the financial institution). The "Customer AG" data system acquires real-time or near real-time data associated with one or more consumer accounts. In addition, the "EDW" data system is an aggregated data source that provides aggregated information on various consumers.

In one embodiment, each data system in the system 100 (such as the real estate loan system 101, for example) has its own associated pre-processor, such as pre-processor 104, and one or more pre-processors (not shown) associated with the one or more additional data sources. Each pre-processor gathers data from its associated data system for input to a decision engine 106 and/or a collections system 108 (each described in further detail hereinbelow). When third parties operate data systems employed in the system 100, such third parties may allow operators of the system 100 to obtain data by accessing the pre-processor 104. In alternative embodiments of the present invention, data from the data systems can be transmitted directly or indirectly to the pre-processor 104. Data systems such as the MSP, ALS, and LeaseMaster Systems, for example, may have different and incompatible data formats. Therefore, each pre-processor 104 contains applications or modules to access data system files and/or databases, and to reformat gathered data, when necessary, to a standardized, normalized format useable by the decision engine 106 and the collections system 108. In one illustrative configuration, the core of the pre-processor 104 software code is reusable and portable, and may be customized for each data system that is configured and added to the system 100.

One or more data stores 110 may store data, such as data that is not available or retained in one or more other data systems employed by the system 100. In one embodiment, the data in the data stores 110 may be provided and populated by the pre-processor 104. Examples of kinds of stored data include historical information (e.g., twelve-month rolling aged delinquency history); account status information that may be compared in a financial cycle to determine account status changes (e.g., newly bankrupt, rollback of delinquency, and the like); and data for the decision engine 106 (e.g., risk level). The pre-processor 104 may use data obtained from the data stores 110 for decision-making functions. For instance, if a comparison between values in a current cycle and values in a previous cycle indicates that an account status change has occurred, then the pre-processor 104 may generate transactions or events for input to the decision engine 106 and/or the collections system 108.

In one embodiment of the present invention, the decision engine 106 includes an adaptive control engine that segregates data based, at least in part, on one or more decision tables. Past and present behaviors associated with accounts, as well as data management strategies, for example, may affect segregation by the decision engine 106. In one illustrative embodiment, the decision engine 106 identifies delinquent accounts to be sent to a collections agent, for example, for immediate handling, and the decision engine 106 also routes associated data to the collections system 108. In various embodiments, non-delinquent accounts may be processed by modules outside of the system 100. One example embodiment of the decision engine 106 is a decision engine marketed under the "STRATA" trade designation (marketed and offered by AMS—American Management Systems). In various embodiments of the present invention, the decision engine 106 receives reformatted data from the pre-processor 104. Other types of decision engines may be used, however, in addition to or in place of the decision engine 106. These other decision engines may include use of data associated with other accounts of a lender financial institution, for example, which other accounts may not be related to data systems such as the MSP, Indirect ALS, or LeaseMaster Systems, for example.

In one embodiment of the present invention, the collections system 108 can be provided as a collections system marketed under the "CACS" (Computer Aided Collection System) trade designation (offered by AMS). In one embodiment, the collections system 108 may be stored and executed on an IBM MVS mainframe platform. In another aspect, the collections system 108 can utilize COBOL programming language. In one embodiment, the collections system 108 includes a workflow engine that handles delinquent accounts whose associated data was received from the decision engine 106. In various embodiments, the collections system 108 may provide various functions. For instance, the collections system 108 may manage collection activity of accounts and segregate accounts for handling. To determine how to segregate accounts, the collections system 108 may apply one or more sets of business rules. In one aspect of the present embodiments, accounts may be segregated as portfolios.

In another aspect, a "CICS" product (IBM) may be employed to access data on the collections system 108 in an online mode, for example, such as via a PC 3270 session executed on a 3270 client 112. While one such 3270 client 112 is shown in FIG. 1, it can be appreciated that any number of such clients may be provided. In one aspect, the client 112 may be a client within a network of an operator of the system 100. In another aspect, the client 112 and the desktop access device 124 (see discussion hereinbelow) may be part of the same device. As such, an agent or operator of the system 100 may access the collections system 108 from either a graphical user interface, for example, of the desktop access device 124, or by using a PC 3270 session on the 3270 client 112. Therefore, it can be appreciated that a PC 3270 session may provide a secondary back-up mechanism for access to the data of the collections system 108. In other embodiments of the present invention, one or more third parties external to the system 100 may access the collections system 108.

The system 100 may include an inbound call system 114 and one or more outbound dialers 116 by which telephone communications between agents and delinquent or non-delinquent account holders can be received or initiated, respectively. It can be appreciated that connections between the system 100 and PSTN's (public switched telephone networks), for example, or other communications interfaces, are not shown in FIG. 1 for convenience of disclosure. In one embodiment, the inbound call system 114 can include an interactive voice response (IVR) unit as shown in FIG. 1. Using the IVR, for example, customers placing calls to the system 100 may choose to be routed to a live agent at one of the desktop access devices 124, or to interact with the collections system 108 using the IVR unit. In an embodiment, in one mode, the outbound dialers 116 only handle outbound calls routed to the outbound dialers 116.

In an embodiment, the outbound dialers 116 can accept inbound calls or initiate outbound calls when operating in a blended mode. The outbound dialers 116 may include an operative association with one or more databases 116A. In an illustrative implementation, the collections system 108 creates a daily dialer file with information, including telephone contact information, for delinquent accounts, and sends the dialer file, by FTP (File Transfer Protocol) or another suitable protocol, to one or more of the outbound dialers 116. The dialer file may be stored in one or more databases 116A such as, for example, one or more trade-designated "Mosaix" databases. Alternatively or additionally, other types of dialers and databases may be employed, such as those offered under the "Genesys" trade designation, for example.

Embodiments of the present invention may utilize a predictive outbound dialer, such as the trade-designated skiptracing Simon, to locate customers without a valid phone number.

An agent or operator at the desktop access device 124 may log on to a dialer dialog on a graphical user interface, for example, on the desktop access device 124. Using information stored in the database or databases 116A of the outbound dialers 116, the outbound dialers 116 may place a call or calls to one or more delinquent account holders. As the associated telephone number is dialed, the agent may be permitted to access basic information on the desktop access device 124 about the account at issue. When the account holder responds to the telephone call, the agent may readily and efficiently discuss the account information with the account holder. A main page of the graphical user interface may appear, for example, displaying detailed information from the collections system 108. Thus, call campaigns may be initiated by using the outbound dialers 116 and their associated database or databases 116A. In an embodiment, the database or databases 116A may be used for inbound calls received when the outbound dialers 116 operate in a blended mode.

A recovery management system 118 can also be employed in the system 100 in operative association with the collections system 108. One example of a recovery management system is the trade-designated "RMS" product (offered by London Bridge Group). In one illustration, the recovery management system 118 may be embodied as a system of record for accounts whose account holders are bankrupt or for accounts that have associated charge-off transactions. In one embodiment, a charge-off notification is sent to the desktop access device 124 and formatted into a graphical user interface by using the pre-processor 104. In one aspect, the graphical user interface can include a mechanism to charge-off the designated account, and the charged-off account can then be maintained by the recovery management system 118.

Figure 2:
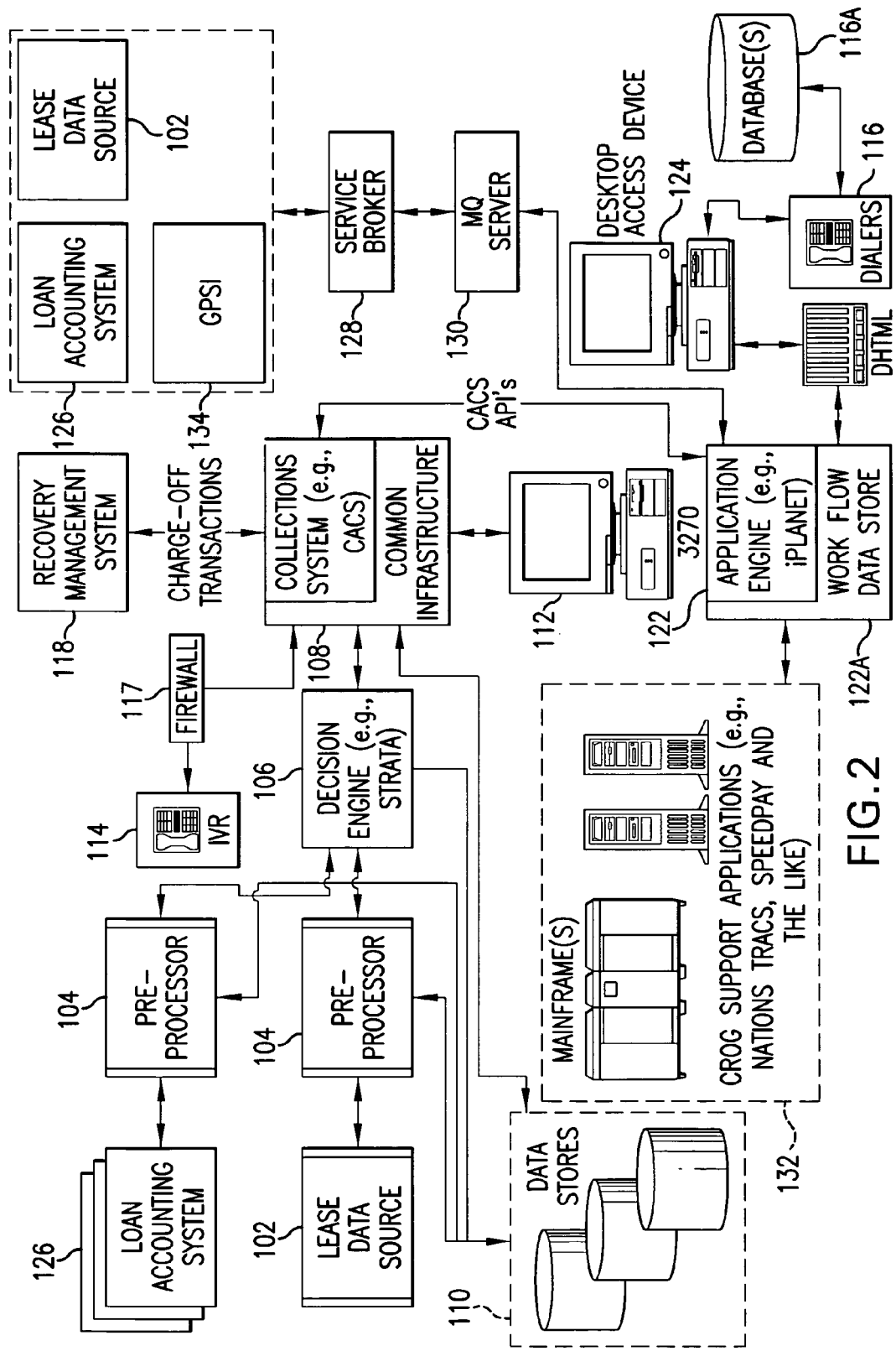
FIG. 2 is a schematic diagram of an illustrative system provided in accordance with various embodiments of the present invention.

Referring now to FIG. 2, an application server 122 hosts applications that can be executed by an agent at the desktop access device 124. In various embodiments, the desktop access device 124 application may be an Internet-based application. The application server 122 may be implemented, for example, on the UNIX-based "Sun Solaris" platform, or as an IBM "WebSphere" server, or a BEA Systems "WebLogic" server, among other application servers suitable for use in accordance with the present invention. The application server 122 integrates various applications or modules in the system 100, such that an agent can access the applications or modules using a single, substantially unified GUI displayed at the desktop access device 124. In one embodiment, a client-server architecture is used with applications stored and executed at the application server 122 and with the client application executed at the desktop access device 124. It can be appreciated that there can be, in one illustrative embodiment, a plurality of the desktop access devices 124, with a plurality of associated agents, served by a single application server 122.

Through one or more GUI's executed on the desktop access device 124, the agent may interact in real-time or near real-time with one or more records stored on local or remote backend systems 101, 102, 126, 108, 122, and others. This interaction may include, for example, real-time access and update of data. Such real-time or near real-time updates may eliminate redundant data entry. The GUI may present a common view of such data for an agent. As such, it can be seen that the agent need not be conversant with the syntax and interfaces of a variety and multitude of backend systems. In addition, by locating the desktop access device 124 application in one location on the application server 122, modifications can be made to the server application software code in a cost-effective manner. Software distribution costs, for example, need not be incurred for software installation at one or more desktop access device 124 clients, for example.

By using the desktop access device 124, an agent may initiate and respond to a variety of requests. For instance, an agent may make a request to view a customer account. Application server 122 may send a message via an MQ server 130 to the collections system 108 to facilitate the request. Similarly, if an agent needs to waive a late fee for a customer, for example, or activate any other supported loan or lease function, the application server 122 may send messages, via an MQ server 130 through or bypassing a service broker 128, to the real estate loan system 101, loan accounting system 126, and/or the lease data source 102 data systems. In one illustrative embodiment, the application executed on the desktop access device 124 may be written to conform to the Java 2 Enterprise Edition (J2EE). In another illustrative implementation, the desktop access device 124 may comprise a TCP/IP network connection with the application server 122.

In another illustrative scenario, when an agent logs into the desktop access device 124, a message is sent to the MQ server 130, then to the collections system 108. The collections system 108 can then return a work list to the application server 122 for use by the agent. In one embodiment, the application server 122 accesses a workflow data store 122A. The workflow data store 122A can store data on a short-term basis for use in multi-process workflows. As such, an agent need enter data only once, and the entered data may be retained for other agents or users. In an illustrative refinancing scenario, an agent may enter account data that may be accessed by other agents. Without duplicative entry of the entered data, the account may be referred to another agent, who may approve the creation of another account; establish a new account; and the existing account may be removed from the system 100. In various embodiments, the workflow data store 122A may be implemented as an "Oracle" database, for example, on a dedicated server apart from the application server 122. In another illustrative aspect, the dedicated server may run in a "Supernova" environment. In various aspects of the present invention, the workflow data store 122A can be employed, for example, for monitoring NSF checks, managing consumer debt information, and/or loan information including graduation information, and for performing various other business processes and for processing various other business information.

In an embodiment, a workflow may comprise software modules that automatically control and structure an agent's handling of specific transactions. These modules may involve software processes executing in the foreground or background, dialog boxes projected on the agent's GUI, prompts, and/or other components that interactively guide an agent through a given transaction, taking actions on behalf of the agent and/or requesting input or actions by the agent. Accordingly, workflows may improve quality, standardization, and efficiency of agent actions, more effectively servicing customers and increasing overall collections.

The desktop access device 124 executes one or more applications hosted by the application server 122. In an illustrative embodiment, the desktop access device conforms to a thin client concept, wherein the desktop access device 124 includes an off-the-shelf or proprietary World Wide Web browser that hosts pages associated with the applications executed on the desktop access device 124. For instance, the desktop access device 124 may run "Microsoft Internet Explorer" or "Netscape" trade-designated browser software. The trade-designated "Oracle PL/SQL" may be used for related software programming. In one embodiment, pages from the application server 122 may be received by the desktop access device 124 via DHTML (Dynamic Hypertext Markup Language). It can be appreciated that use of DHTML may facilitate presentation of relatively large amounts of data to the desktop access device 124. In various implementations, a web browser on the desktop access device 124 functions without specialized plug-ins. In alternative embodiments, plug-ins such as, for example, Enterprise Java Beans, Active X controls, and other like plug-ins, may be utilized.

In various embodiments of the present invention, the system 100 may include one or more support applications such as CROG support applications 132 shown in FIG. 2. The support applications may include applications useful to an agent at the desktop access device 124. In one embodiment, agents who utilize the desktop access device 124 and its applications to handle collections, recovery, and other issues are considered part of a CROG (Consumer Risk Operations Group). An agent may access the support applications 132 through the application server 122, which can act as an intermediary between the desktop access device 124 and the support applications 132. In other embodiments, the desktop access device 124 can have a direct connection to one or more of the support applications 132. Examples of support applications 132 include "NationsTracs" and "Speedpay" applications. In various embodiments, NationsTracs and other support applications 132 are internal applications of Bank of America Corporation. It can be appreciated that these support applications 132 may be readily replaced with analogous applications created by persons of ordinary skill in the art. "NationsTracs" facilitates handling of an asset, such as a vehicle, for example, that has been repossessed. NationsTracs handles data and can include processing that begins with inspection of the repossessed vehicle and extends to auction of the vehicle. "Speedpay" (offered by E Commerce Group) enables EFT's (electronic funds transfers) to occur between accounts of the financial institution in order to satisfy account holder delinquencies, as well as the tendering of physical checks, for example.

In various embodiments of the present invention, the service broker 128 enables bi-directional communications between the application server 122 and various modules and/or applications executed within the system 100. In an illustrative implementation, one or more messages sent between various modules/applications in the system 100 conform to the "MQ" (Message Queuing) protocol (offered by IBM). The MQ server 130 handles message queuing for messages sent through the service broker 128 and for messages received by service broker 128. The MQ server 130 may constitute one or more servers in various embodiments. Various API's (application programmatic interfaces, not shown) may be employed to convert messages to an MQ format, or to convert MQ-formatted messages to the format of another module in the system 100. In other embodiments, certain messages may be routed between modules in the system 100 via the MQ server 130 without use of the service broker 128.

In various embodiments of the present invention, a GPSI (Global Party System Index) 134 aggregates customer information. Accordingly, an agent at the desktop access device 124 may gain access to customer information relating to other accounts of the customer including, for example and without limitation, credit, mortgage, checking, and savings accounts. For example, from the desktop access device 124, an agent may click a button on a request tab. Using a GPSI identification of the customer as a search key, the GPSI 134 may return a list of associated accounts for the customer.

In another embodiment, an architecture to enable CRM (customer relationship management) may be employed in the system 100 to provide a comprehensive picture of the relationship of a customer with a bank, for example. A CRM architecture may facilitate relationship-based collections (RBC). For example, an agent may access some or all accounts of a customer and perform necessary operations on the respective accounts, such as transfers of funds to/from the accounts. The use of the GPSI 134 may facilitate use of CRM architecture. In one embodiment, the GPSI 134 can interface with the decision engine 106. This interface permits different actions to be taken depending on which account at the financial institution is considered the lead account for a given customer. In one example, this interface can permit selection of which account is most profitable to the financial institution for a given customer. This selection of a most profitable account can then be employed to drive a collections strategy. For example, if a customer of the financial institution happens to be delinquent on a monthly mortgage payment, other comparatively more profitable accounts for that customer might drive a strategy not to immediately initiate collection and recovery proceedings for that one payment. If the customer has no other accounts, however, the financial institution may pursue collection and recovery efforts on the one delinquent account. Thus, embodiments herein assist agents in providing differentiated services among customers of the financial institution.

In an embodiment, the system 100 displays on an agent GUI aggregated information associated with the non-delinquent and delinquent accounts of a customer, as well as a unique operational workflow, to facilitate collections activities.

Example automated workflows that may be incorporated into systems herein include account operations workflows: (1) Genesys Dialer—ability to contact accounts to make arrangement for payment of delinquent balance via Genesys Dialer platforms; and (2) Generate Letter—request customer correspondence or letters for accounts that are generated by the collections system 108, during nightly batch processing, for example.

Example maintenance operations workflows include: (1) Payment Arrangement—establish, update, or create arrangements for payment of delinquent balance; and (2) Fast Data—locate services for delinquent account owners.

Example loss prevention workflows include: (1) Repo Referral—initiates referral for repossession of collateral; (2) Foreclosure Referral—initiates foreclosure of real estate property; (3) Advocacy Referral—refers an account for Advocacy services to assist with an altered payment schedule to remain current; and (4) Bankruptcy Referral—initiate bankruptcy processing for an account.

Example worklist operations workflows provide an agent with the ability to work an organized, logical group of delinquent MSP, real estate, or other accounts. In particular, such workflows may include: Worklist Statistics; Start Worklist; Resume Worklist; Start Browse Worklist; and Resume Browse Worklist.

An example on-request workflow includes Transaction History, which provides transaction history for MSP accounts.

In an embodiment, the system 100 evaluates multiple delinquent relationships for delinquent accounts related to a first delinquent account, establishes a "parent and child" relationship between those delinquent accounts (the child accounts) and the first delinquent account (the parent account), and establishes a workflow to drive work of the parent account record. The system 100 may enable a link from the parent account to the child accounts in order to facilitate collections activities. In addition, the system 100 may enable the evaluation of the multiple account relationships in order to establish a "relationship" strategy, which provides a single contact to a customer, allowing servicing activities for the multiple delinquencies.

In other embodiments, the financial institution may apply other kinds of loans to the system 100 such as credit card loans, for example.

Figure 3:
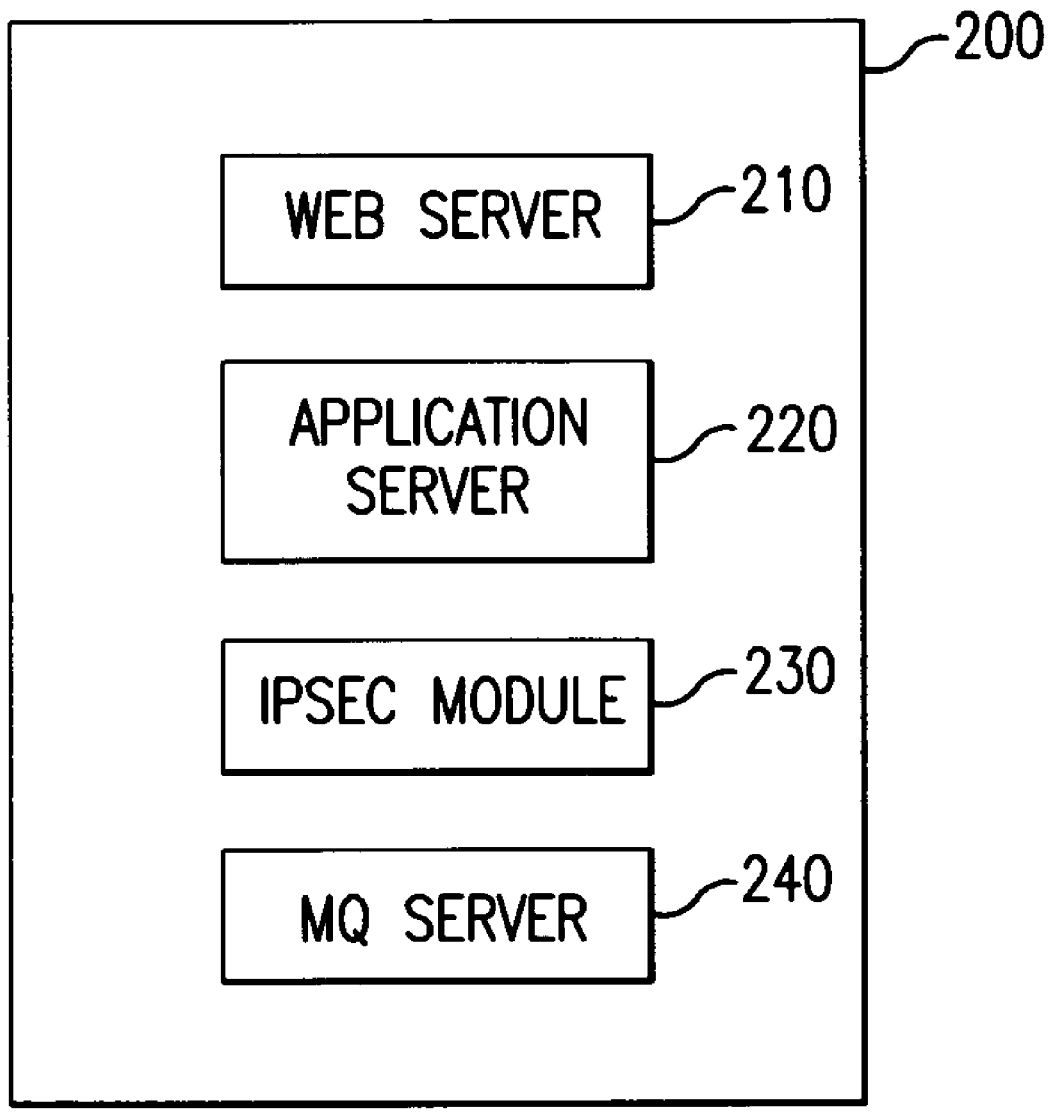
FIG. 3 is a schematic diagram depicting an alternative embodiment for one or more portions of either or both systems of FIG. 1 and FIG. 2.

Referring now to FIG. 3, a server architecture 200 according to one illustrative embodiment of the present invention is provided. In various embodiments, the server architecture 200 may be implemented in one physical device. The server architecture 200 may represent an implementation of applications or modules in the system 100, including the application server 122 and the MQ server 130. The server architecture 200 includes a web server 210, an application server 220, an IPsec module 230, and an MQ server 240. The web server 210 hosts the applications executed by the desktop access device 124 for use by an agent at the desktop access device 124 in the system 100, as described hereinabove. The application server 220 provides the functionality of the application server 122 described in the system 100 (see discussion hereinabove). The MQ server 240 provides the functionality of the MQ server 130 described hereinabove. The IPsec module 230 securitizes requests communicated from the application server 220 to the MQ server 240.

Figure 3A:
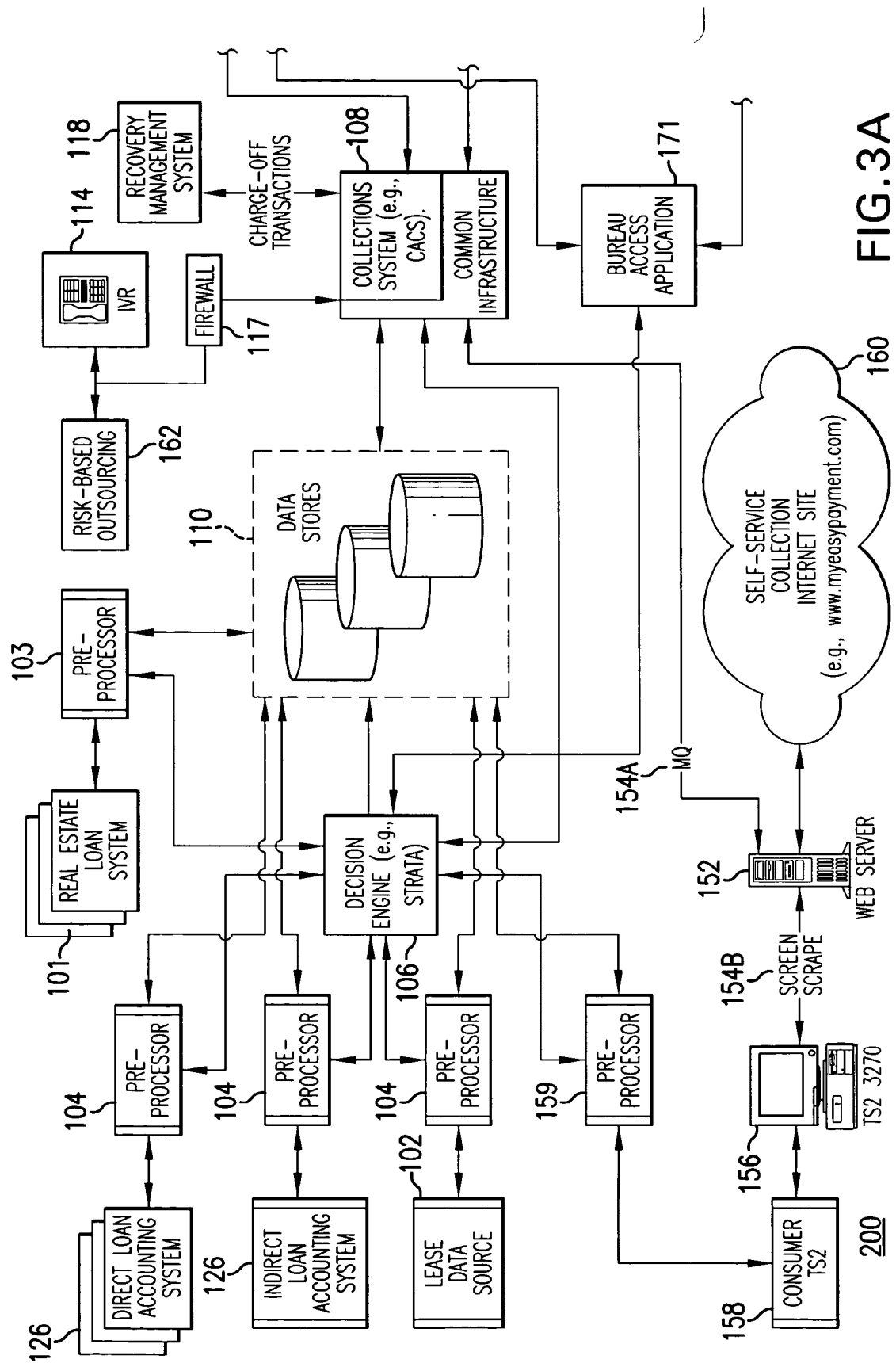
FIG. 3A is a schematic diagram depicting an alternative embodiment for one or more portions of any or all systems of FIG. 1, FIG. 2, and FIG. 3.

Referring now to FIG. 3A, in another illustrative embodiment of the present invention, a system 200 can be provided for enabling collection and recovery transactions and data processing related to one or more real estate loan-related, other loan-related, lease-related, and consumer credit-related operations. Although the illustrated embodiment supports all such operations, it is to be appreciated that other embodiments may support fewer operations. For instance, an alternative embodiment may support operations related to real estate loans and consumer credit, but not related to lease arrangements or other direct and indirect loans.

Various modules and applications within the system 200 are described hereinabove in connection with FIGS. 1, 2, and 3.

As shown in FIG. 3A, the real estate loan system 101 has a pre-processor 103 and may be located in a location proximate to, or remote from, other modules in the system 200. In an embodiment, a transaction history message conveys information between the real estate loan system 101 and other modules in the system 200 via the MQ server 130 and not via the service broker 128. An agent at the desktop access device 124 can select a transaction history tab to access such information. In another embodiment, multiple kinds of messages are conveyed between the real estate loan system 101 and other modules in the system 200 via the MQ server 130 through the service broker 128 (connections not shown in FIG. 3A).

In an embodiment, each real estate loan maintained by the real estate loan system 101 is processed by the pre-processor 103 on a one-time basis so that, among other things, loan information and any previous historical collections information (e.g., pending Promises to Pay (PTPs) and Future Hold Date accounts) may be converted and stored within the data stores 110 for use by modules in the system 200. Subsequent processing of the loan by the system 200 depends on whether the loan has or returns to a default status, that is, the loan is past due and possibly in need of attention by collections agents. It is to be appreciated that, depending on the actions of a consumer, loans may periodically cure and then later become past due on a repeated basis.

In an implementation, a nightly batch process of the pre-processor 103 is run. The batch process searches for loans with a default status and imports into the data stores 110 associated records including, for example, amount due, collections status, and other loan information. If the batch process determines that a loan with a default status previously has been in collections in the system 200 and thus has previous stored collections history in the data stores 110, then new imported collections information is merged with the previous collections history.

In an embodiment, if collections efforts result in a customer payment in partial or complete satisfaction of an amount due on a real estate loan, the pre-processor 103 updates loan status in the real estate loan system 101.

As also shown in FIG. 3A, loan accounting systems 126 are provided for direct secured loans and indirect secured loans, respectively. The loan accounting systems 126 have respective pre-processors 104 (or alternatively, a single associated pre-processor 104) and may be respectively located in locations proximate to, or remote from, other modules in the system 200.

The system 200 includes a bureau access application 171 that is operatively associated with the decision engine 106, collections system 108, and application server 122. Bureau access application 171 retrieves from a credit bureau information associated with a customer's credit history. In an embodiment, bureau access application 171 is the trade-designated "BureauLink" (offered by AMS). An agent at the desktop access device 124 (or 3270 client 112) can seamlessly select a BureauLink menu option while viewing account information for a particular customer on the agent GUI. Responsive to the selection, a dialog box is populated with the customer's account information and displayed on the desktop access device 124. Via the GUI, the agent then can request a credit report for the customer from the credit bureau. Once the information is retrieved, the agent can view and print the information, which may be formatted by the system 200 in a format identical to that customarily used by the credit bureau. In related embodiments, agents with the requisite security level can request reports from alternative or additional credit bureaus. It can be seen that embodiments herein enable an agent to seamlessly access credit bureau information by utilizing a single GUI.

In one embodiment, a consumer card web server 152 can be configured to receive screen scrape data transmissions 154B from a "TS2" 3270 client 156 operatively associated with a Consumer "TS2" data system 158 ("TS2" is a trade designation of EDS). In one aspect, the Consumer "TS2" data system 158 maintains an operative connection to a pre-processor 159, so that data communicated from the Consumer "TS2" data system 158 to the decision engine 106 can be readily received, interpreted and processed by the decision engine. It can be appreciated that, where appropriate and applicable, any suitable credit card accounting system can be employed in addition to, or in place of, the Consumer "TS2" data system 158.

As applied herein to various screen scrape data transmission embodiments, software and/or hardware can be provided that allow a computer or server, for example, to obtain character-based data from a mainframe computer system (e.g., a 3270 client). Conventional screen scraper software/hardware can be employed to present the character-based data in a comparatively more user-friendly format, such as in a graphical user interface, for example. In one example embodiment, the screen scraper software can present information in HTML format, so that the information can be readily accessed with a conventional Internet browser, for example. Examples of providers of screen scrape technology include the trade-designated "Mozart" (e.g., as marketed at "www.mozart.com"); the trade-designated "Flashpoint, Inc." (e.g., as marketed at "www.flashpt.com"); and the trade-designated "Intelligent Environments" (e.g., as marketed at "www.screensurfer.com").

In another embodiment of the present invention, the decision engine 106, through its operative connection to the MQ server 130 through the application server 122 and through or bypassing the service broker 128, can receive and process information related to one or more real estate loan, other loan, lease, or consumer credit operations. It can be appreciated that the use of the screen scrape functionality described hereinabove is not critical to any embodiment of the present invention. In general, any suitable system or method for communicating customer obligation data to the decision engine 106 can be applied in various embodiments of the present invention.

In an example, a real estate loan customer consistently makes payments on the 15$^{th}$ day of each month. The customer's loan cures on the 17$^{th}$ day due to processing delays inherent in the real estate loan system 101. On the 16$^{th}$ day, because the loan is past due (in default status), the batch process of the preprocessor 103 (described above) imports associated information for this delinquent loan into the system 200. However, upon running algorithms involving the customer's payment profile and other data, the decision engine 106 may determine that the customer's loan should not be queued up for collections, for the loan most likely will cure on the 17$^{th}$ day without a need for intervention by a collections agent. In various embodiments, the decision engine 106 may have associated strategy definitions to define how to handle delinquent loans of the real estate loan system 101.

In another embodiment of the system 200 of FIG. 3A, the web server 152 can be operatively associated with a self-service collection Internet site 160. An example of a self-service collection Internet site suitable for use in accordance with various embodiments of the present systems and methods is the "www.myeasypayment.com" site (supported by Douglas Daniel Corporation, based in Chicago, Ill.). In one aspect, the self-service collection site 160 permits a consumer to perform one or more activities pursuant to an obligation of the consumer to a financial institution. Examples of such activities include, without limitation, setting up a debt payment program, receiving debt counseling, preparing a debt management or debt reduction program, and other like activities.

In another embodiment of the system 200 of FIG. 3A, one or more risk-based outsourcing functions 162 can be performed in connection with the operation of the decision engine 106. In general, risk-based outsourcing functions 162 include one or more collection agencies, for example, which operate externally and independently of the financial institution. Accounts assigned to the risk-based outsourcing functions 162 may be assigned based on a number of factors associated with an account, including an evaluation of risk associated with the account, for example. Via automated or manual processes, such accounts may be subsequently retrieved and reassigned to the financial institution. In exemplary implementations, queues of agencies may be maintained to facilitate interactions involving the financial institution, agencies, and/or other actors.

One or more modules in systems 100 and 200, such as the collections system 108, may maintain various queues, such as collections queues, to differentiate among accounts and other data, and tailor how the accounts are processed by relevant modules. For instance, in one embodiment, 5-day, 30-day, 90-day, 120-day, and 150-day collections queues respectively correspond to accounts that are overdue by at least 5, 30, 90, 120, and 150 days. Such queues may be further divided into manual and dialer queues, for example. Further, accounts to be reaged for some reason may be placed in one or more associated queues.

In other embodiments, multiple accounts of a customer may be consolidated into one account of the collections system 108, such as at the request of the customer. Such multiple account relation (MAR) consolidation may achieve enhanced system efficiencies and higher levels of customer service.

It is to be appreciated that updating of data employed by various modules depicted in systems 100 and 200 above may occur in real-time or at other predetermined or ad hoc intervals. Batch processing techniques, including batch interfaces, for example, may be incorporated in various embodiments.

Interfaces, such as API's, between modules in systems 100 and 200 may be implemented in various ways. In an embodiment, the collections system 108 interfaces to the application server 122 via XML (Extensible Markup Language)-formatted data.

In sample embodiments, systems 100 and 200 may facilitate a host of activities, such as the opening and closing of customer accounts, the identification of bankruptcy situations, and authorization and revocation of credit, for example.

The following operational examples include illustrative graphical user interfaces that may be employed in connection with one or more embodiments of the present invention. It can be appreciated that no particular aspect or aspects of these examples are intended to limit the scope of the present invention. The examples are provided for illustration purposes and to demonstrate interaction of an agent or agents with various applications or modules, or variants thereof, executed within the present systems.

Figure 4:
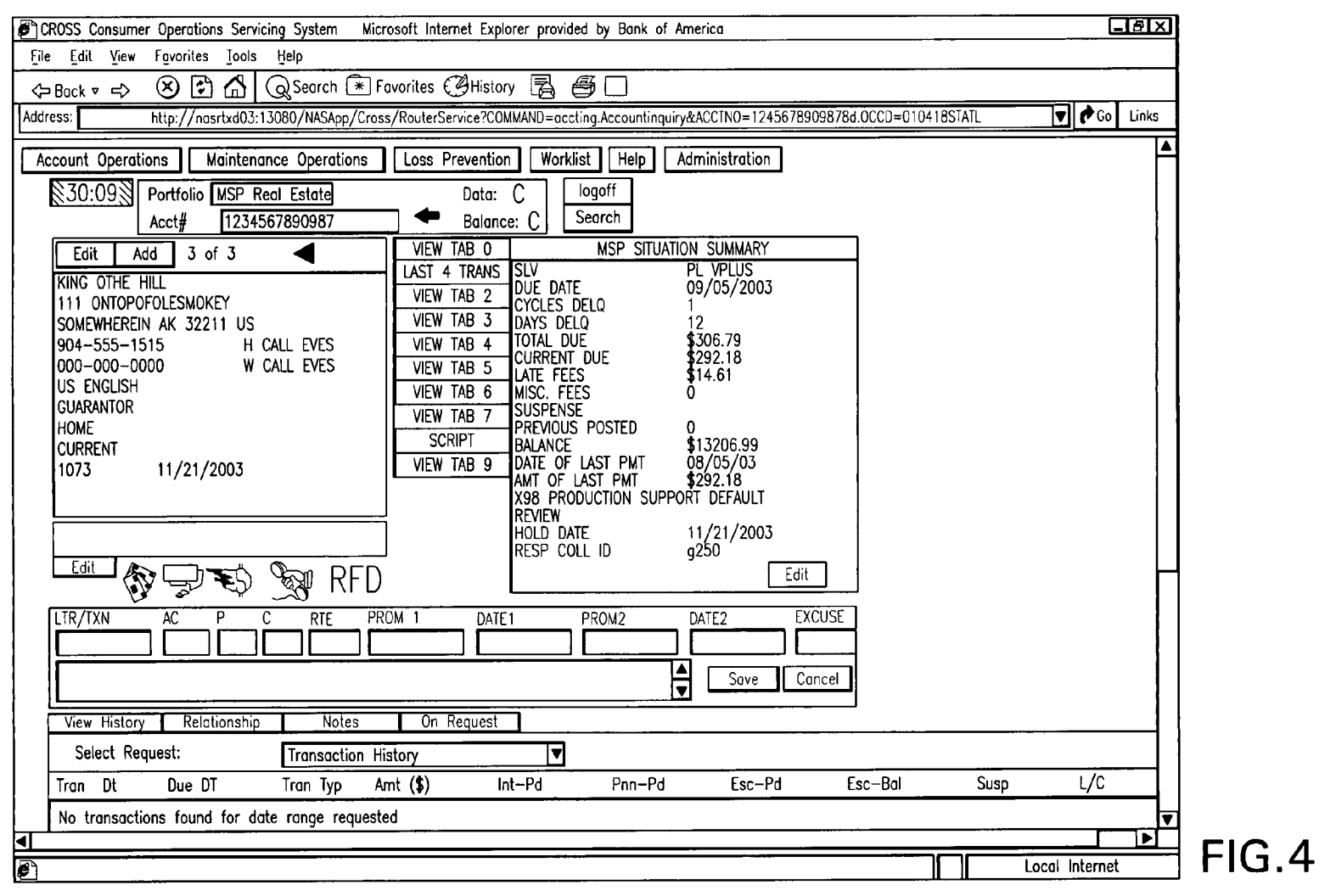

FIG. 4 includes a graphical user interface that permits an agent employing the system to access summary information for a selected account of a collections system such as the collections system 108.

FIG. 5 includes a graphical user interface that permits an agent employing the system to update or add payment arrangement information for a customer.

FIG. 6 includes a graphical user interface that permits an agent employing the system to update or add repossession referral information for a selected account of a collections system such as the collections system 108.

Figure 7:
FIG. 7 is an illustrative graphical user interface that can be employed in connection with one or more embodiments of the present invention.

FIG. 7 includes a graphical user interface that permits an agent employing the system to view collections activity for a selected account of a collections system such as the collections system 108.

FIG. 7 includes a graphical user interface that permits an agent employing the system to access the transaction history for a selected account.

The benefits of the present invention can be readily appreciated by those skilled in the art. In the area of financial services, no one has previously integrated all of the functions described hereinabove into a single system. This system integration includes integrating legacy functions on a legacy infrastructure with incompatible software, hardware, databases, and communication protocols into a system that provides virtual compatibility through a single GUI on a desktop access device, or thin client. This approach would be cheaper than any end-to-end enterprise resource planning that undertakes "start from scratch" solutions. The problems addressed by the present invention were not previously identified, much less addressed, in the financial services industry. The present invention also provides advantages to a financial institution by enhancing customer service processing through real-time or near real-time access to customer accounts by an agent coupled with permitting customer access to accounts.

The present invention integrates access through a single GUI (graphical user interface) on a single workstation to a substantial part of the collections and recovery process, including accessing and integrating data and functions from incompatible legacy systems supported by different parties in the collections and recovery industry. In one embodiment, the invention integrates data from a real estate loan system, with data from an incompatible auto lease system, with data from an incompatible financial records system internal to the financial institution. Incoming telephone IVR and inbound/outbound automated dialing functionality are also incorporated in association with different vendor systems. The entire system is accessible by a plurality of collections and recovery representatives, each accessing the system through a single browser-based GUI and a desktop access device. Additions, updates, and deletions of other systems, databases, and functions to the present invention are facilitated through API's, pre-processors, and other functionality. An automated decision engine may also be integrated into the system. It can be seen that the embodiments described hereinabove are particularly useful for the financial industry, including banking institutions and other lenders, as well as for entities that interact with the financial industry.

Various embodiments of the present invention provide the ability for system users to process various independent and different packets or portions of the collections and recovery process as if those packets were part of the same unified system or methodology. In addition, various aspects of the present invention include a relationship-based collections system, wherein the total relationship of a consumer to a financial institution can be reviewed and analyzed to maximize the benefits of the relationship for both the consumer and the financial institution. For example, the financial institution can consider and execute overall decisions based on all accounts held by the consumer with the financial institution, rather than reviewing and acting on single consumer accounts one at a time and in isolation from other consumer accounts. It can be seen, therefore, that aspects of the present invention foster financial analysis and decisions based on aggregated data rather than isolated pieces of data.

In addition, embodiments described herein are useful for other collections entities, including third party collection agencies, as well as for entities related to the telecommunications industry and power utilities, for example. By using a single GUI, an agent may interact seamlessly and in real-time with records stored on local or remote backend systems. Interaction may include, for example, real-time accessing and updating of data. Such real-time updates may eliminate or substantially reduce redundant data entry. The GUI may present an agent with a common view of data and transactions for the entire integrated system. As such, the agent need not be conversant with various interfaces of various backend systems. The GUI may use various screens, fields on screens, dialog boxes, icons, and other devices to enable access and display of data, entry of input data, and execution of transactions. Various embodiments may involve workflow automation, wherein execution time of processes may be reduced from days and hours to just seconds. In accordance with the presented embodiments, paper flow may be reduced or eliminated, and efficiency and customer service levels may be enhanced.

The foregoing description of the various embodiments of the present invention is provided to enable any person skilled in the art to make and use the present invention and its embodiments. Various modifications to these embodiments are possible, and the generic principles presented herein may be applied to other embodiments as well. For instance, in one embodiment, data for both delinquent and non-delinquent accounts may be inputted to, and handled by, the collections system 108. As such, agents at the desktop access device 124 may be presented with a total picture of the relationship of an account holder with a bank. Thus, agents may have access to other accounts, such as checking and savings accounts, of a delinquent account holder. Accordingly, an agent may ensure that a delinquent customer whose other accounts are in good standing may be treated with a service level consistent with that relationship. Moreover, funds may be transferred from such accounts to satisfy the account holder's obligations.

In addition, embodiments of the present invention may be implemented in loan contexts related to real estate, such as mortgage contexts. In other embodiments, multiple entities may operate the system 100. For instance, a bank may enlist agents at third party agencies to service accounts. The agents may utilize desktop access devices 124 located on the premises of the third party agencies. Further, aspects of the present invention may be implemented in part or in whole as a hard-wired circuit, as a circuit configuration fabricated into an application-specific integrated circuit, or as a firmware program loaded into non-volatile storage, or a software program loaded from or into a data storage medium as machine-readable code. Such machine-readable code may include instructions executable by an array of logic elements, such as a microprocessor or other digital signal processing unit.

It will be apparent to one of ordinary skill in the art that the embodiments as described hereinabove may be implemented in many different embodiments of software, firmware, and hardware in the entities illustrated in the figures. The actual software code or specialized control hardware used to implement the present invention is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

The term computer-readable medium is understood by those skilled in the art. It can be appreciated, for example, that method aspects described herein may be performed, in certain embodiments, using instructions stored on a computer-readable medium or media that direct a computer system to perform the method aspects. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A computer or computer system may be, for example, a wireless or wireline variety of a microcomputer, minicomputer, laptop, personal data assistant (PDA), wireless e-mail device (e.g., BlackBerry), cellular phone, pager, processor, any programmable device capable of configuration for transmitting and receiving data over a network, or any other computer or computer system. Computer devices disclosed herein can include, for example, memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other like computer-readable media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present invention disclosed herein, a single component can be replaced by multiple components, and multiple components replaced by a single component, to perform a given function or functions. Except where such substitution would not be operative to practice the present invention, such substitution is within the scope of the present invention.

Examples presented herein are intended to illustrate sample implementations of the present method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A system to process data related to an obligation of a customer of a financial institution and to facilitate collection and recovery efforts associated with said obligation, wherein said obligation data includes at least real estate loan related data, said system comprising:
   a decision engine configured to receive obligation data from at least one data system related to said obligation, wherein said at least one data system is maintained by an entity having a third party relationship with respect to said financial institution, wherein said at least one data system includes a real estate loan accounting system, wherein said at least one data system employs a data format incompatible with respect to a data format employed by at least another data system that provides data to said decision engine, said decision engine further configured to identify at least a delinquent situation associated with said data;
   a collections system operatively associated with said decision engine, said collections system configured to receive and manage said obligation data;
   an application server operatively associated with said collections system, said application server configured to receive said obligation data from said collections system, wherein said application server includes at least one workflow data store configured to store workflow data;
   a desktop access device configured to display at least one graphical user interface to an agent of said financial institution, said graphical user interface including at least a portion of said obligation data;
   at least one pre-processor operatively associated with said at least one data system;
   at least one data store operatively associated with said at least one pre-processor;
   an inbound call system operatively associated with said decision engine, wherein said inbound call system includes an interactive voice response unit;
   at least one outbound dialer operatively associated with said decision engine, wherein said outbound dialer is associated with at least one database and the at least one database is used for inbound calls when the at least one outbound dialer operates in a blended mode;
   at least one recovery management system operatively associated with said collections system;
   at least one support application operatively associated with said application server;
   a global party system index configured to aggregate said obligation data of said customer; and
   an interface between said global party system index and said decision engine.

2. A system to process data related to an obligation of a customer of a financial institution and to facilitate collection and recovery efforts associated with said obligation, said system comprising:
   a decision engine configured to receive obligation data from at least one data system related to said obligation, said decision engine further configured to identify at least a delinquent situation associated with said data;
   a collections system operatively associated with said decision engine, said collections system configured to:
     receive and manage said obligation data;
     maintain a plurality of queues for differentiating among accounts and for tailoring how the accounts are processed; and
     delay queuing of a loan of the customer based on a customer payment profile;
   an application server operatively associated with said collections system, said application server configured to receive said obligation data from said collections system; and
   a desktop access device configured to display at least one graphical user interface to an agent of said financial institution, said graphical user interface including at least a portion of said obligation data.

3. The system of claim 2, wherein said obligation data includes at least real estate loan related data.

4. The system of claim 3, wherein said at least one data system includes a loan accounting system.

5. The system of claim 4, wherein said loan accounting system is MSP (Mortgage Servicing Package).

6. The system of claim 2, wherein said at least one data system is maintained by an entity having a third party relationship with respect to said financial institution.

7. The system of claim 2, wherein said decision engine is configured to determine whether to queue a real estate loan for collections based at least in part on a customer profile associated with the real estate loan.

8. The system of claim 2, wherein said decision engine is configured to receive obligation data from at least two data systems, wherein at least one of said at least two data systems employs a data format incompatible with respect to a data format employed by at least another of said at least two data systems.

9. The system of claim 2, further comprising at least one pre-processor operatively associated with said at least one data system.

10. The system of claim 9, wherein said at least one pre-processor is configured to run a batch process to import, from said at least one data system to said collections system, information associated with delinquent real estate loans.

11. The system of claim 9, further comprising at least one data store operatively associated with said at least one pre-processor.

12. The system of claim 11, wherein said at least one data store includes data related to said obligation data and selected from a group comprising historical delinquency information, account status information of an account of said customer, account comparison information of an account of said customer, and risk level information suitable for processing by said decision engine.

13. The system of claim 2, wherein said collections system is configured for access by a PC 3270 session.

14. The system of claim 2, further comprising an inbound call system operatively associated with said decision engine.

15. The system of claim 14, wherein said inbound call system includes an interactive voice response unit.

16. The system of claim 2, further comprising at least one outbound dialer operatively associated with said decision engine.

17. The system of claim 16, wherein said outbound dialer is associated with at least one database.

18. The system of claim 17, wherein said database is configured to receive at least one daily dialer file generated by said collections system.

19. The system of claim 2, further comprising at least one recovery management system operatively associated with said collections system.

20. The system of claim 19, wherein said recovery management system is configured to receive at least one charge-off notification from said collections system.

21. The system of claim 2, wherein said collections system is configured to communicate a work list related to said obligation data to said application server.

22. The system of claim 21, wherein said desktop access device is configured to receive said work list from said application server.

23. The system of claim 2, wherein said application server includes at least one workflow data store configured to store workflow data.

24. The system of claim 2, further comprising at least one support application operatively associated with said application server.

25. The system of claim 2, further comprising a global party system index configured to aggregate said obligation data of said customer.

26. The system of claim 25, wherein said at least one graphical user interface is configured to display data received from said global party system index.

27. The system of claim 25, further comprising an interface between said global party system index and said decision engine.

28. The system of claim 2, wherein said graphical user interface further includes real-time data associated with at least one delinquent account of the customer and real-time data associated with at least one non-delinquent account of the customer and incorporates an operational workflow, to facilitate customer relationship-based management (CRM) of the customer.

29. The system of claim 2, wherein said collections system includes at least one account associated with a multiple account relation (MAR) consolidation.

30. The system of claim 2, wherein said collections system is configured to facilitate relationship-based collections (RBC) using a parent and child relationship among accounts of the customer.

31. A method to process data related to an obligation of a customer of a financial institution and to facilitate collection and recovery efforts associated with said obligation, said method comprising:
receiving obligation data from at least one data system related to said obligation by a decision engine configured to identify at least a delinquent situation associated with said data;
receiving and managing said obligation data in a collections system operatively associated with said decision engine;
maintaining, by the collections system, a plurality of queues for differentiating among accounts and for tailoring how the accounts are processed;
delaying queuing a loan of the customer based on a customer payment profile;
receiving said obligation data from said collections system in an application server; and
displaying at least one graphical user interface to an agent of said financial institution on a desktop access device, said graphical user interface including at least a portion of said obligation data.

32. The method of claim 31, wherein said obligation data includes at least real estate loan related data.

33. The method of claim 32, wherein said at least one data system includes a loan accounting system.

34. The method of claim 33, wherein said loan accounting system is MSP (Mortgage Servicing Package).

35. The method of claim 31, wherein said at least one data system is maintained by an entity having a third party relationship with respect to said financial institution.

36. The method of claim 31, wherein said decision engine is configured to determine whether to queue a real estate loan for collections based at least in part on a customer profile associated with the real estate loan.

37. The method of claim 31, wherein said decision engine is configured to receive obligation data from at least two data systems, wherein at least one of said at least two data systems employs a data format incompatible with respect to a data format employed by at least another of said at least two data systems.

38. The method of claim 31, wherein at least one pre-processor is operatively associated with said at least one data system.

39. The method of claim 38, wherein said at least one pre-processor is configured to run a batch process to import, from said at least one data system to said collections system, information associated with delinquent real estate loans.

40. The method of claim 38, wherein at least one data store is operatively associated with said at least one pre-processor.

41. The method of claim 40, wherein said at least one data store includes data related to said obligation data and selected from a group comprising historical delinquency information, account status information of an account of said customer, account comparison information of an account of said customer, and risk level information suitable for processing by said decision engine.

42. The method of claim 31, wherein said collections system is configured for access by a PC 3270 session.

43. The method of claim 31, wherein an inbound call system is operatively associated with said decision engine.

44. The method of claim 43, wherein said inbound call system includes an interactive voice response unit.

45. The method of claim 31, wherein at least one outbound dialer is operatively associated with said decision engine.

46. The method of claim 45, wherein said outbound dialer is associated with at least one database.

47. The method of claim 46, wherein said database is configured to receive at least one daily dialer file generated by said collections system.

48. The method of claim 31, wherein at least one recovery management system is operatively associated with said collections system.

49. The method of claim 48, wherein said recovery management system is configured to receive at least one charge-off notification from said collections system.

50. The method of claim 31, wherein said collections system is configured to communicate a work list related to said obligation data to said application server.

51. The method of claim 50, wherein said desktop access device is configured to receive said work list from said application server.

52. The method of claim 31, wherein said application server includes at least one workflow data store configured to store workflow data.

53. The method of claim 31, wherein at least one support application is operatively associated with said application server.

54. The method of claim 31, wherein a global party system index is configured to aggregate said obligation data of said customer.

55. The method of claim 54, wherein said at least one graphical user interface is configured to display data received from said global party system index.

56. The method of claim 54, wherein an interface exists between said global party system index and said decision engine.

57. The method of claim 31, wherein said graphical user interface further includes real-time data associated with at least one delinquent account of the customer and real-time data associated with at least one non-delinquent account of the customer, to facilitate customer relationship-based management (CRM) of the customer.

58. The method of claim 31, further comprising consolidating multiple accounts of the customer according to a multiple account relation (MAR) consolidation.

59. The method of claim 31, further comprising processing accounts of the customer according to a relationship-based collections (RBC) mode.

60. A computer-readable medium including instructions for performing a method to process data related to an obligation of a customer of a financial institution and to facilitate collection and recovery efforts associated with said obligation, said medium comprising:

instructions for receiving obligation data from at least one data system related to said obligation by a decision engine including instructions for identifying at least a delinquent situation associated with said data;

instructions for receiving and managing said obligation data in a collections system operatively associated with said decision engine;

instructions for maintaining, by the collections system, a plurality of queues for differentiating among accounts and for tailoring how the accounts are processed;

instructions for delaying queuing a loan of the customer based on a customer payment profile;

instructions for receiving said obligation data from said collections system in an application server; and instructions for displaying at least one graphical user interface to an agent of said financial institution on a desktop access device, said graphical user interface including at least a portion of said obligation data.

61. The computer-readable medium of claim 60, wherein said obligation data includes at least real estate loan related data.

62. The computer-readable medium of claim 60, further comprising instructions for consolidating multiple accounts of the customer according to a multiple account relation (MAR) consolidation.

63. The computer-readable medium of claim 60, further comprising instructions for processing accounts of the customer according to a relationship-based collections (RBC) mode.

64. A system to process data related to an obligation of a customer of a financial institution and to facilitate collection and recovery efforts associated with said obligation, said system comprising:

means for receiving obligation data from at least one data system related to said obligation by a decision engine means for identifying at least a delinquent situation associated with said data;

collection means for receiving and managing said obligation data and being operatively associated with said decision engine means;

means for maintaining, by the collections system, a plurality of queues for differentiating among accounts and for tailoring how the accounts are processed;

means for delaying queuing a loan of the customer based on a customer payment profile;

server means for receiving said obligation data from said collections means and being operatively associated with said collection means; and means for displaying at least one graphical user interface to an agent of said financial institution, said graphical user interface including at least a portion of said obligation data.

65. The system of claim 64, wherein said obligation data includes at least real estate loan related data.

66. The system of claim 64, further comprising means for consolidating multiple accounts of the customer according to a multiple account relation (MAR) consolidation.

67. The system of claim 64, further comprising means for processing accounts of the customer according to a relationship-based collections (RBC) mode.

* * * * *

UNITED STATES PATENT AND TRADEMARK OFFICE
CERTIFICATE OF CORRECTION

| | | |
|---|---|---|
| PATENT NO. | : 7,702,575 B1 | Page 1 of 1 |
| APPLICATION NO. | : 10/779167 | |
| DATED | : April 20, 2010 | |
| INVENTOR(S) | : Scott Lofton et al. | |

It is certified that error appears in the above-identified patent and that said Letters Patent is hereby corrected as shown below:

On the Title page, Related U.S. Application Data:
        Please insert:
--(63) Continuation-in-Part of application No. 10/340,205, filed on Jan. 10, 2003.
 (60) Provisional application No. 60/395,790, filed on July 12, 2002.--

Signed and Sealed this
Twenty-second Day of February, 2011

David J. Kappos
*Director of the United States Patent and Trademark Office*